United States Patent [19]

Milliren et al.

[11] Patent Number: 5,457,137
[45] Date of Patent: Oct. 10, 1995

[54] WATER BLOWN, ENERGY ABSORBING FOAMS

[75] Inventors: Charles M. Milliren, Coraopolis; Ronald Zibert, Burgettstown, both of Pa.

[73] Assignee: Bayer Corporation, Pittsburgh, Pa.

[21] Appl. No.: 390,187

[22] Filed: Feb. 17, 1995

Related U.S. Application Data

[62] Division of Ser. No. 319,189, Oct. 6, 1994, Pat. No. 5,415,802.

[51] Int. Cl.$^6$ .................................................. C08G 18/06
[52] U.S. Cl. ..................... 521/115; 521/118; 521/137; 521/160; 521/167; 521/174
[58] Field of Search ..................... 521/115, 118, 521/160, 167, 174, 137

[56] References Cited

U.S. PATENT DOCUMENTS

| | | | |
|---|---|---|---|
| 3,926,866 | 12/1975 | Komatsu et al. | 260/2.5 AH |
| 4,116,893 | 9/1978 | Flanagan | 521/137 |
| 4,190,712 | 2/1980 | Flanagan | 521/137 |
| 4,212,954 | 7/1980 | Nomura et al. | 521/159 |
| 4,282,330 | 8/1981 | Austin | 521/118 |
| 4,371,629 | 2/1983 | Austin | 521/115 |
| 4,614,754 | 8/1986 | Christman | 521/167 |
| 4,866,102 | 9/1989 | Pray et al. | 521/137 |
| 5,143,941 | 9/1992 | Rossio et al. | 521/51 |
| 5,167,884 | 12/1992 | Rossio et al. | 264/45.5 |
| 5,187,204 | 2/1993 | Jackson et al. | 521/111 |
| 5,216,041 | 6/1993 | Rossio et al. | 521/137 |
| 5,232,957 | 8/1993 | Pritchard et al. | 521/174 |

*Primary Examiner*—Morton Foelak
*Attorney, Agent, or Firm*—Joseph C. Gil

[57] ABSTRACT

A novel isocyanate reactive mixture is described which allows for the preparation of energy absorbing foams which meet Chrysler specification DC-640. The reactive mixture contains a) a filled polyol, b) a propylene oxide adduct of a mono-, di-, or trialkanolamine and c) a polyoxyalkylene polyamine. Foams prepared from the reactive mixture are also described.

4 Claims, No Drawings

WATER BLOWN, ENERGY ABSORBING FOAMS

This application is a division of application Ser. No. 08/319,189 filed Oct. 6, 1994, now U.S. Pat. No. 5,415,802.

BACKGROUND OF THE INVENTION

Energy absorbing foams based upon urethane chemistry are known in the art. The early literature generally utilized halocarbon blowing agents (see, e.g., U.S. Pat. No. 3,926, 866). A significant number of patents have issued relating to water blown energy absorbing foams based upon polyols ("filled polyols") prepared by polymerizing styrene/acrylonitrile monomer mixtures in polyethers (see, e.g., U.S. Pat. Nos. 4,116,893, 4,190,712, 4,212,954, 4,866,102, 5,216,041 and 5,232,957). Other patented technology describes the use of relatively low molecular weight crosslinkers (see, e.g., U.S. Pat. Nos. 4,282,330, 5,143.941, and 5,167,884) or the use of various polyols, such as ethylene oxide adducts of Mannich condensates (U.S. Pat. No. 4,371,629), alkoxylated toluene diamine (U.S. Pat. No. 4,614,754), or polyols derived from propylene glycol or ethylene diamine (U.S. Pat. No. 5,187,204).

In addition, we are aware of a commercially available system for the production of energy absorbing foam consisting of:

a) 30 parts by weight of a dispersion of a polyhydrazodicarbonamide in a relatively high molecular hydroxyl-containing material;

b) 25 parts by weight of a 630 OH number adduct of ethylene diamine and propylene oxide, c) 30 parts by weight of a 28 OH number adduct of propylene glycol, propylene oxide and ethylene oxide (having a 13% by weight EO tip), d) 1 part by weight of a silicone surfactant, e) 6.7 parts by weight of water, f) 0.1 part by weight of a catalyst for catalyzing the reaction between water and an isocyanate group, and g) 152 parts of a polymethylene poly(phenyl isocyanate).

While some of the systems noted above have been used commercially, the search continues for systems which will produce energy absorbing foams which will meet a variety of specifications such as Chrysler specification DC-640 for knee impact, and which also meet commercial production processing requirements of 12 second mold closing, 3 minute demold and low molding pressure. "Mold closing" is defined as the time from the start of the introduction of the foamable reactants into the mold until the mold is dosed. "Demold" time is defined as the time from the start of the introduction of the foamable reactants into the mold until the finished part is removed from the mold. "Molding pressure" is defined as the pressure created in the dosed mold by the reacting and gelling reaction mixture and retained internally by the foam if the closed cell content is high.

DESCRIPTION OF THE INVENTION

A technology based upon a novel polyol mixture has now been developed which allows for the production of energy absorbing foams which meet the above-noted Chrysler specification and which meet the commercial production requirements of 12 second mold closing, 3 minute demold and low molding pressure.

The novel polyol mixture unexpectedly allows for the use of a wide range of water levels to produce molded foams of varying densities—all of which exhibit good dimensional stability and a very uniform type of energy absorption. The water level can be adjusted easily to adjust the foam density and allow the foam to meet the above-noted Chrysler specification. This novel polyol mixture avoids the use of low molecular weight ethylene diamine based crosslinkers which tend to increase closed cell content and foam pressure. "Foam pressure" is the internal foam pressure from the dosed cell content of the foam. Ethylene diamine based crosslinkers are so catalytic that they control the reaction and create more dosed cells and therefore higher foam pressures. At 3 minute demold, this causes post expansion and foam splitting. The novel mixture also allows for the production of foams displaying very low foam pressures with good moldability.

The present invention is directed to an isocyanate reactive mixture and to a foam produced therefrom. More particularly, the isocyanate reactive mixture of the present invention comprises:

a) from about 25 to about 50% by weight of a filled polyol having an OH number of from 25 to 50, b) from 0 to about 30% by weight (and preferably from about 15 to about 30% by weight) of a polyether diol having a hydroxyl functionality of 2 and having an OH number of from about 25 to about 75, and wherein at least 75% of the hydroxyl groups are primary hydroxyl groups, c) from about 20 to about 70% by weight (and preferably from about 20 to about 55% by weight) of an adduct of a mono-, di-, or trialkanolamine and propylene oxide, said adduct having a hydroxyl number of from about 100 to about 800, and d) from about 5 to about 20% by weight of a polyoxyalkylene polyamine having a molecular weight of from about 2000 to about 5000, and containing from 2 to 3 primary amino groups, wherein the percents by weight are based upon the total weight of the isocyanate reactive mixture and wherein the percents by weight total 100%. Component a) is preferably a dispersion of a polyurea and/or polyhydrazodicarbonamide in a relatively high molecular weight organic compound containing at least two hydroxyl groups, wherein the concentration of the polyurea and/or polyhydrazodicarbonamide is from 1 to 40% by weight based upon 100 parts by weight of said organic compound, and wherein said dispersion has an OH number of from 25 to 50.

In addition, the present invention is directed to a water blown, energy absorbing foam produced by reacting:

A) the above-described isocyanate reactive mixture,

B) a polymethylene poly(phenyl isocyanate) containing from about 40 to about 85% by weight of methylene bis(phenyl isocyanate) and having an isocyanate group content of from about 20 to about 35% by weight (preferably from about 30 to about 35% by weight, and most preferably from about 31 to about 33% by weight), with the amount of said isocyanate B) being such that the isocyanate index of the mixture of all the isocyanate reactive components and said isocyanate is from about 95 to about 105, and C) from about 2 to about 10 parts by weight per 100 parts by weight of component A) of water, in the presence of D) from 0 to about 1 part by weight per 100 parts by weight of component A) of a silicone surfactant, E) from about 0.05 to about 1.0 part by weight per 100 parts by weight of component A) of an amine compound which will catalyze the reaction between water and an isocyanate group.

The novel technology herein yields several unexpected findings in addition to those noted above. The foams produced herein have high open cell content (typically >95%) and uniform cell structure. Lower pressure in the molded foam is attainable with faster demold times. Finally, foams of uniform energy absorption properties with easy density adjustments can be produced by merely changing the amount of water used.

The foams of the present invention are directed to a water blown, energy absorbing foam broadly produced by reacting A) a specified isocyanate reactive mixture, B) a polymethylene poly(phenyl isocyanate), and C) water, in the presence of D) a silicone surfactant, and E) a catalyst.

The isocyanate reactive mixture A) comprises the following specific components: a) a filled polyol having an OH number of from 25 to 50, b) optionally, a polyether diol having a hydroxyl functionality of 2 and having an OH number of from about 25 to about 75, and wherein at least 75% of the hydroxyl groups are primary hydroxyl groups, c) an adduct of a mono-, di-, or trialkanolamine and propylene oxide, said adduct having a hydroxyl number of from about 100 to about 800, and d) a polyoxyalkylene polyamine having a molecular weight of from about 2000 to about 5000, and containing from 2 to 3 primary amino groups.

Component A)d) is a polyoxyalkylene polyamine having a molecular weight of from about 2000 to about 5000, and containing from 2 to 3 primary amine groups. Such polyamines are known in the art. One method for preparing such amines is the amination of polyhydroxy polyethers (e.g., polypropylene glycols) by a reaction with ammonia in the presence of Raney nickel and hydrogen (Belgian Patent 634,741). U.S. Pat. No. 3,654,370 discloses the preparation of polyoxyalkylene polyamines by reaction of the corresponding polyol with ammonia and hydrogen in the presence of a nickel, copper, or chromium catalyst. The preparation of polyethers containing amino end groups by the hydrogenation of cyanoethylated polyoxypropylene ethers is described in German Patent 1,193,671. Other methods for the preparation of polyoxyalkylene polyamines are described in U.S. Pat. Nos. 3,155,728 and 3,236,895 and French Patent 1,551,605. Commercially available polyether polyamines are sold by Texaco under the Jeffamine tradename.

Component A)a) is a filled polyol. The term "filled polyol" as used herein means: i) dispersions of polyureas and/or polyhydrazodicarbonamides in relatively high molecular weight organic compounds containing at least two hydroxyl groups, ii) polymer polyols prepared by polymerizing one or more ethylenically unsaturated monomers, such as styrene and acrylonitrile, in relatively high molecular weight organic compounds containing at least two hydroxyl groups, and iii) mixtures thereof. These filled polyols are known and can be characterized as hydroxyl containing compounds which contain high molecular weight polyadducts, polycondensates or polymers in finely dispersed or dissolved form. Polymer polyols are known. Methods for their manufacture are described in U.S. Pat. Nos. 3,383,351, 3,304,273, 3,523,093, 3,652,639, 3,823,201, and 4,390,645, all the disclosures which are hereby incorporated by reference. The polyurea and/or polyhydrazo-dicarbonamide dispersions are also known and are prepared by reacting an organic polyisocyanate with polyamines containing primary and/or secondary amine groups, hydrazines, hydrazides, or a mixture thereof in the presence of relatively high molecular weight hydroxyl-containing materials. These dispersions described in U.S. Pat. No. 4,042,537, 4,089,835, 3,325,421, 4,092,275, 4,093,569, 4,119,613, 4,147,680, 4,184,990, 4,293,470, 4,296,213, 4,305,857, 4,305,858, 4,310,448, 4,310,449, 4,324,716, 4,374,209, 4,496,678, 4,523,025, 4,668,734, 4,761,434, and 4,847,320, all the disclosures which are hereby incorporated by reference. The dispersions typically have solids contents of from 1 to 40% by weight and preferably from 10 to 30% by weight.

The other polyols used in component A) and their methods of manufacture are generally known in the art. These are produced by the addition of epoxides (preferably ethylene and/or propylene oxide) either in admixture or successively, to compounds containing reactive hydrogen atoms. Examples of suitable reactive compounds for components A)b) include propane diol, dipropylene diol, butane diol and the like, while mono-, di- and trialkanolamines are used to produce component A)c). In the case of component A)b), ethylene oxide is utilized to cap the polyol with the requisite content of primary hydroxyl groups.

The polymethylene poly(phenyl isocyanates) useful herein are known in the art and are produced by reacting phosgene with aniline/formaldehyde condensates. Known processes for preparing the aniline/formaldehyde condensates and the resultant polyisocyanates are described in the literature and in many patents, for example, U.S. Pat. Nos. 2,683,730, 2,950,263, 3,012,008, 3,344,162 and 3,362,979. The isocyanates useful herein contain from about 40 to about 85% by weight of methylene bis(phenyl isocyanate) and have an isocyanate group content of from about 20 to about 35% by weight (preferably from about 30 to about 35% by weight and most preferably from about 31 to about 33% by weight). As noted above, the isocyanate index of the total system is from about 95 to about 105.

Water is used in an amount ranging from about 2 to about 10 pads by weight per 100 pads by weight of component A).

The silicone surfactants, which can be used in amounts of from 0 to about 1.0 pad by weight per 100 pads by weight of component A), are known in the art. In fact, one advantage of the present invention is that the surfactant is not even necessary. Polyether siloxanes are particularly suitable silicone surfactants; especially useful are those which are water soluble. These compounds generally have a polydimethyl siloxane group attached to a copolymer of ethylene oxide and propylene oxide. Foam stabilizers of this kind are known and have been described, for example, in U.S. Pat. Nos. 2,834,748, 2,917,480 and 3,629,308. Also useful are the known polysiloxane surfactants generally used in the polyurethane art.

The reaction mixture must also contain a catalyst in an amount of from about 0.05 to about 1.0 parts by weight per 100 parts by weight of component A). Catalysts which promote the reaction of water and isocyanate groups are known in the art. These catalysts are generally known and include tertiary amines such as triethylamine, tributylamine, N-methylmorpholine, N-ethylmorpholine, N-cocomorpholine, N,N,N',N''' -tetramethyl-ethylene-diamine, 1,4-diazabicyclo-(2,2,2)-octane, N-methyl -N'-dimethyl-amino-ethylpiperazine, N,N-dimethylbenzylamine, bis-(N,N -diethylaminoethyl)-adipate, N,N-diethylbenzylamine, pentamethyl -diethylenetriamine, N,N-dimethyl-cyclohexylamine, N,N,N',N'-tetramethyl -1,3-butanediamine, N,N-dimethyl-β-phenylethylamine 1,2-dimethylimidazole, 2-methylimidazole and the like. Also useful are the commercially available tertiary amines such as Niax Al and Niax A107, available from Union Carbide; Thancat DD, available from Texaco; and the like. Mannich bases known per se obtained from secondary amines such as dimethylamine and aldehydes, preferably formaldehyde, or ketones such as acetone, methyl ethyl ketone or cyclohexanone and phenols such as phenol nonylphenol or bisphenol may also be used as catalysts. Silaamines having carbon-silicon bonds as described, e.g., in German Patent No. 1,229,290 and U.S. Pat. No. 3,620,984 may also be used as catalysts. Examples include 2,2,4-trimethyl-2-silamorpholine and 1,3-diethylaminoethyltetramethyldisoloxane.

According to the invention, the components may be reacted together by known processes often using mechanical devices such as those described in U.S. Pat. No. 2,764,565. Details concerning processing apparatus which may be used according to the invention may be found in Kunststoff Handbuch, Volume VII, published by Vieweg and Höchtlen, Carl-Hanser-Verlag, Munich, 1966, pages 121 and 205.

The foaming reaction is carded out inside molds. In this process, the foamable reaction mixture is introduced into a mold which may be made of a metal such as aluminum or a plastics material such as an epoxide resin. The reaction mixture foams up inside the mold to produce the shaped product. The process of foaming in molds is carded out to produce a product having a cellular structure. According to the invention, the desired result can be obtained by introducing just sufficient foamable reaction mixture to fill the mold with foam after the reaction is completed.

So-called external mold release agents known in the art, such as silicone waxes and oils, are frequently used when foaming is carded out inside the molds. The process may also be carded out with the aid of so-called internal mold release agents, if desired, in combination with external mold release agents. e.g., described in German Offenlegungsschriften Nos. 2,121,670 and 2,307,589.

The invention is further illustrated but is not intended to be limited by the following examples in which all parts and percentages are by weight unless otherwise specified.

EXAMPLES

In the examples which follow, the following materials were used:

a) Polyol A: a dispersion of a polyurea having an OH number of about 45 and a solids content of about 28%, and commercially available as Multranol 9184 from Miles Inc.

b) Polyol B: a polyether prepared from propylene glycol, propylene oxide and ethylene oxide having an OH number of about 28 and a primary hydroxyl group content of about 75%. The weight ratio of propylene oxide to ethylene oxide is about 6.7:1, c) Polyol C: a monoethanolamine/propylene oxide adduct having a molecular weight of about 240 (OH number 700).

d) Amine: Jeffamine T-5000, a 5000 molecular weight polypropylene oxide triamine, commercially available from Texaco.

e) Water f) B8002: a commercially available silicon for cell stabilization and cell size regulation from Goldschmidt.

g) A1: Niax A1, a tertiary amine catalyst commercially available from Union Carbide.

h) Iso A: a polymethylene poly(phenyl isocyanate) containing about 45% by weight diisocyanate, having an isocyanate group content of about 31.5%, an equivalent weight of about 133, and a viscosity of about 200 mPa.s at 25° C., commercially available from Miles Inc.

i) Iso B: a polymethylene poly(phenyl isocyanate) containing about 59% by weight diisocyanate, having an isocyanate group content of about 32.25%, an equivalent weight of about 131, and a viscosity of about 60 mPa.s at 25° C., commercially-available from Miles Inc.

Examples 1 and 2

In Examples 1 and 2, the components of the B-side were accurately weighed into a suitable container and mixed using an air driven two blade mixer. The resultant mixture was then taken to the metering equipment. The metering equipment was flushed with the mixture and calibrated for the desired foam index. The mixture was mixed with the isocyanate using high pressure metering equipment (Hennecke HK100) and a Hennecke MQ-12-2 self-cleaning mixhead. Process settings were as follows:

Temperature (B-side and isocyanate): 80° F. (27° C.)

Mix pressures (B-side and isocyanate): 2500 psi (17.5 N/mm$^2$)

Mold temperature: 150° F. (66° C.)

Mold release: PRC 1189C from Chemtrend

Demold time: 3 minutes

The reaction mixture was metered into a 15 inch×15 inch×4 inch (25.4 cm×25.4 cm×6.35 cm) mold (which had been previously sprayed with the mold release), in an amount sufficient to give the desired foam density. The mold was then closed and the foam part demolded after the reaction was complete (3 minutes).

The formulations used and the results obtained were as reported in Table 1 (all amounts are in parts by weight). Testing was conducted in accordance with Chrysler specification DC-640.

TABLE 1

| Example | 1 | 2 | |
|---|---|---|---|
| B-SIDE | | | |
| Polyol A | 35 | 35 | |
| Polyol B | 20 | 20 | |
| Polyol C | 35 | 35 | |
| Amine | 10 | 10 | |
| Water | 7 | 3.1 | |
| B8002 | 0.25 | 0.25 | |
| A1 | 0.3 | 0.3 | |
| ISOCYANATE at 100 Index | | | |
| Iso A | x | x | |
| Density, kg/m$^3$ | 3.38 | 5.32 | ASTM-D-1622 |
| Elongation, % | 10.5 | 13.9 | ASTM-D-3574 |
| MVSS-302, mm/sec | 0 | 0 | |
| Volume change, % | | | ASTM-D-2126 |
| 2B, 28 days | 0.85 | 0.19 | |
| 1D, 28 days | 2.06 | 1.4 | |
| 1K, 28 days | 0.73 | 0.05 | |

Examples 3 through 6

In Examples 3 through 6, the components of the B-side were accurately weighed into a suitable container and mixed. A sufficient amount of isocyanate was then added to the mixture at an isocyanate index of 100 and in an amount sufficient to give 175 grams of total reaction mixture, The mixture was intensively mixed for 10 seconds and the reactivities of the systems were observed. In each case, a foam system having a good reaction profile was obtained.

The formulations used were as reported in Table 2 (all amounts are in parts by weight).

TABLE 2

| Example | 3 | 4 | 5 | 6 |
|---|---|---|---|---|
| B-SIDE | | | | |
| Polyol A | 40 | 30 | 40 | 30 |
| Polyol C | 50 | 60 | 50 | 60 |
| Amine | 10 | 10 | 10 | 10 |
| Water | 4 | 3.25 | 4 | 3.25 |
| B8002 | 0.25 | 0.25 | 0.25 | 0.25 |
| A1 | 0.3 | 0.3 | 0.3 | 0.3 |
| ISOCYANATE | | | | |
| Iso A | x | x | | |
| Iso B | | | x | x |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A water blown, energy absorbing foam produced by reacting:

A) an isocyanate reactive mixture comprising;

1) from about 25 to about 50% by weight of filled polyol having an OH number of from 25 to 50, 2) from 0 to about 30% by weight of a polyether diol having a hydroxyl functionality of 2 and having an OH number of from about 25 to about 75, and wherein at least 75% of the hydroxyl groups are primary hydroxyl groups, 3) from about 20 to about 70% by weight of an adduct of a mono-, di-, or trialkanolamine and propylene oxide, said adduct having a hydroxyl number of from about 100 to about 800, and 4) from about 5 to about 20% by weight of a polyoxyalkylene polyamine having a molecular weight of from about 2000 to about 5000, and containing from 2 to 3 primary amino groups, wherein the percents by weight are based upon the total weight of the isocyanate reactive mixture and wherein the percents by weight total 100%.

B) a polymethylene poly(phenyl isocyanate) containing from about 40 to about 85% by weight of methylene bis(phenyl isocyanate) and having an isocyanate group content of from about 30 to about 35% by weight, with the amount of said isocyanate B) being such that the isocyanate index of the mixture of all the isocyanate reactive components and said isocyanate is from about 95 to about 105, and C) from about 2 to about 10 parts by weight per 100 parts by weight of component A) of water, in the presence of D) from 0 to about 1 part by weight per 100 parts by weight of component A) of a silicone surfactant, E) from about 0.05 to about 1.0 part by weight per 100 parts by weight of component A) of an amine compound which will catalyze the reaction between water and an isocyanate group.

2. The foam of claim 1, wherein said isocyanate has an isocyanate group content of from about 30 to about 35% by weight.

3. The foam of claim 1, wherein said filled polyol is a dispersion of a polyurea and/or Polyhydrazodicarbonamide in a relatively high molecular weight organic compound containing at least two hydroxyl groups, wherein the concentration of the polyurea and/or polyhydrazodicarbonamide is from 1 to 40% by weight based upon 100 parts by weight of said organic compound.

4. The foam of claim 1, wherein component b) is present in an amount of from about 15 to about 30% by weight, and wherein component c) is present in an amount of from about 20 to about 55% by weight.

\* \* \* \* \*